United States Patent
Sakuma

(10) Patent No.: US 11,438,050 B2
(45) Date of Patent: Sep. 6, 2022

(54) WIRELESS COMMUNICATION SYSTEM

(71) Applicant: Fujikura Ltd., Tokyo (JP)

(72) Inventor: Ken Sakuma, Sakura (JP)

(73) Assignee: FUJIKURA LTD., Tokyo (JP)

( * ) Notice: Subject to any disclaimer, the term of this patent is extended or adjusted under 35 U.S.C. 154(b) by 97 days.

(21) Appl. No.: 16/864,270

(22) Filed: May 1, 2020

(65) Prior Publication Data

US 2021/0344401 A1     Nov. 4, 2021

(51) Int. Cl.
| | |
|---|---|
| *H04B 7/06* | (2006.01) |
| *H04W 24/02* | (2009.01) |
| *H04W 72/04* | (2009.01) |
| *H04B 7/08* | (2006.01) |

(52) U.S. Cl.
CPC ......... *H04B 7/0695* (2013.01); *H04B 7/0617* (2013.01); *H04B 7/088* (2013.01); *H04W 24/02* (2013.01); *H04W 72/046* (2013.01)

(58) Field of Classification Search
CPC .... H04B 7/0695; H04B 7/088; H04B 7/0617; H04W 72/046; H04W 24/02
See application file for complete search history.

(56) References Cited

U.S. PATENT DOCUMENTS

| | | | |
|---|---|---|---|
| 7,120,436 B2 | 10/2006 | Kim | |
| 9,913,096 B1* | 3/2018 | Chen | H04W 4/025 |
| 11,018,718 B1* | 5/2021 | Sakuma | H04B 7/0695 |
| 2003/0195017 A1* | 10/2003 | Chen | H01Q 1/246 |
| | | | 455/562.1 |
| 2010/0189079 A1* | 7/2010 | Eichinger | H04B 7/0639 |
| | | | 370/335 |
| 2011/0092238 A1* | 4/2011 | Ishibashi | H04L 5/0023 |
| | | | 455/509 |
| 2019/0075549 A1* | 3/2019 | Yucek | H04W 72/02 |
| 2019/0261198 A1* | 8/2019 | Sarkar | H04J 11/0079 |
| 2019/0372644 A1* | 12/2019 | Chen | H04B 7/0632 |
| 2020/0120458 A1* | 4/2020 | Aldana | H04W 4/08 |

* cited by examiner

*Primary Examiner* — Michael K Phillips
(74) *Attorney, Agent, or Firm* — WHDA, LLP

(57) ABSTRACT

A wireless communication system includes a first wireless communication device and a server communicably connected to the first wireless communication device. The server accumulates a plurality of optimized beam table, and selects therefrom an optimized beam table to be used by the first wireless communication device, and, the first wireless communication device obtains the optimized beam table selected by the server by communicating with the server, and performs a wireless communication using the obtained optimized beam table.

4 Claims, 11 Drawing Sheets

FIG. 5

| | ITEM | TYPE | BYTES | CONTENT |
|---|---|---|---|---|
| 1 | STATION_ID | INT | 4 | Unique Station ID. |
| 2 | SUBSCRIBER_ID | INT | 4 | Unique Subscriber ID. |
| 3 | ACCOUNT_ID | INT | 4 | Unique Account ID. |
| 4 | NAME_FIRST | VARCHAR | variable | First name of subscriber. |
| 5 | NAME_MIDDLE | VARCHAR | variable | Middle name of subscriber. |
| 6 | NAME_LAST | VARCHAR | variable | Last name of subscriber |
| 7 | ADDRESS | VARCHAR | variable | Address of the station. |
| 8 | EQUIPMENT_TYPE | INT | 4 | Equipment type (enum) of the station. |
| 9 | BF_ANT_NO | INT | 4 | Number of Antenna in the Equipment. |
| 10 | BF_ANT_ID_01 | INT | 4 | Unique Antenna ID. |
| 11 | BF_ANT_ID_02 | INT | 4 | Unique Antenna ID. |
| 12 | BF_ANT_ID_03 | INT | 4 | Unique Antenna ID. |
| 13 | BF_ANT_ID_04 | INT | 4 | Unique Antenna ID. |
| 14 | BF_ANT_ID_05 | INT | 4 | Unique Antenna ID. |
| 15 | BF_ANT_ID_06 | INT | 4 | Unique Antenna ID. |
| 16 | BF_ANT_ID_07 | INT | 4 | Unique Antenna ID. |
| 17 | BF_ANT_ID_08 | INT | 4 | Unique Antenna ID. |

FIG. 6A

| STATION_ID | SUBSCRIBER_ID | ACCOUNT_ID | NAME_FIRST | NAME_MIDDLE | NAME_LAST | ADDRESS | EQUIPMENT_TYPE |
|---|---|---|---|---|---|---|---|
| 00060128 | 00001024 | 00000000 | BS | BS | BS | Newtown 6-1440-1 | MMW60BS001RF2 |
| 00062048 | 00065536 | 00066560 | Kenta | | Araragi | Newtown 6-1440-6 | MMW60CPE001RF1 |
| 00062049 | 00065537 | 00066561 | Misaki | | Izayoi | Newtown 6-1440-8 | MMW60CPE001RF1 |
| 00062050 | 00065538 | 00066562 | Syota | | Ugajin | Newtown 6-1440-23 | MMW60CPE001RF1 |
| 00062051 | 00065539 | 00066565 | Takuya | | Enjyu | Newtown 6-1440-26 | MMW60CPE001RF1 |
| 00062052 | 00065540 | 00066566 | Rina | | Okonogi | Newtown 6-1440-29 | MMW60CPE001RF1 |
| 00062053 | 00065541 | 00066569 | Miho | | Kamigaso | Newtown 6-1440-36 | MMW60CPE001RF1 |

FIG. 6B

| BF_ANT_NO | BF_ANT_ID_01 | BF_ANT_ID_02 | BF_ANT_ID_03 | BF_ANT_ID_04 | BF_ANT_ID_05 | BF_ANT_ID_06 | BF_ANT_ID_07 | BF_ANT_ID_08 |
|---|---|---|---|---|---|---|---|---|
| 2 | 00002624 | 00002625 | 0 | 0 | 0 | 0 | 0 | 0 |
| 1 | 00065536 | 0 | 0 | 0 | 0 | 0 | 0 | 0 |
| 1 | 00065537 | 0 | 0 | 0 | 0 | 0 | 0 | 0 |
| 1 | 00065538 | 0 | 0 | 0 | 0 | 0 | 0 | 0 |
| 1 | 00065539 | 0 | 0 | 0 | 0 | 0 | 0 | 0 |
| 1 | 00065540 | 0 | 0 | 0 | 0 | 0 | 0 | 0 |
| 1 | 00065541 | 0 | 0 | 0 | 0 | 0 | 0 | 0 |

FIG. 7

| ITEM | TYPE | BYTES | CONTENT |
|---|---|---|---|
| 1 BF_ANT_ID | INT | 4 | Unique Antenna ID. |
| 2 BF_ANT_TYPE | INT | 4 | Antenna type (enum) of the antenna. |
| 3 BF_ANT_LATITUDE | DOUBLE | 8 | North latitude of the antenna. |
| 4 BF_ANT_LONGITUDE | DOUBLE | 8 | East longitude of the antenna. |
| 5 BF_ANT_ORIENTATION | DOUBLE | 8 | Orientation of the antenna. |
| 6 BF_ANT_MAX_SECTOR_NO | INT | 4 | Maximum sector number of the antenna. |
| 7 BF_ANT_MAX_BEAM_NO | INT | 4 | Maximum beam number of the antenna. |
| 8 BF_ANT_CUR_BEAMTABLE | UUID | 16 | UUID of current downloaded optimized beam table. |
| 9 BF_ANT_CUR_BEAM_NO | INT | 4 | Beam number of current beam table. |

FIG. 8

| BF_ANT_ID | BF_ANT_TYPE | BF_ANT_LATITUDE | BF_ANT_LONGITUDE | BF_ANT_ORIENTATION | BF_ANT_MAX_SECTOR_NO | BF_ANT_MAX_BEAM_NO | BF_ANT_CUR_BEAMTABLE | BF_ANT_CUR_BEAM_NO |
|---|---|---|---|---|---|---|---|---|
| 00002624 | MM60_16_16_A | 35.699784 | 140.223699 | 345 | 1 | 63 | c4a0469c-0bd8-4f51-8b76-7a9163cd89e9 | 61 |
| 00002625 | MM60_16_16_A | 35.699784 | 140.223699 | 75 | 1 | 63 | 322aea22-0990-460f-99e0-1327cbbd05a1 | 61 |
| 00065536 | MM60_16_16_A | 35.700183 | 140.224095 | 220 | 1 | 63 | d172b0ba-2b35-44db-8ea5-715e60b1da98 | 61 |
| 00065537 | MM60_16_16_A | 35.700454 | 140.223919 | 195 | 1 | 63 | 43148b25-11bb-4257-b298-8818e5624e84 | 61 |
| 00065538 | MM60_16_16_A | 35.700637 | 140.223419 | 165 | 1 | 63 | 43148b25-11bb-4257-b298-8818e5624e84 | 61 |
| 00065539 | MM60_16_16_A | 35.700634 | 140.223073 | 150 | 1 | 63 | d172b0ba-2b35-44db-8ea5-715e60b1da98 | 61 |
| 00065540 | MM60_16_16_A | 35.700272 | 140.222905 | 125 | 1 | 63 | 779f6ed0-aa12-4561-8e9c-b1a121ce4f56 | 61 |
| 00065541 | MM60_16_16_A | 35.700146 | 140.222748 | 115 | 1 | 63 | 43148b25-11bb-4257-b298-8818e5624e84 | 61 |

FIG. 9

| ITEM | TYPE | BYTES | CONTENT |
|---|---|---|---|
| 1 FROM_BF_ANT_ID | INT | 4 | Unique Antenna ID of link start point. |
| 2 TO_BF_ANT_ID | INT | 4 | Unique Antenna ID of link end point. |
| 3 LINK_ORIENTATION | DOUBLE | 8 | Orientation of the link. |
| 4 LINK_BF_DIRECTION | DOUBLE | 8 | Beam direction of the link by the antenna. |
| 5 LINK_DISTANCE | DOUBLE | 8 | Distance of the link. (unit: m) |

FIG. 10

| FROM_BF_ANT_ID | TO_BF_ANT_ID | LINK_ORIENTATION | LINK_BF_DIRECTION | LINK_DISTANCE |
|---|---|---|---|---|
| 00002624 | 00065536 | 38.9921 | 36.0079 | 56.959 |
| 00002624 | 00065537 | 14.9940 | 60.0060 | 76.959 |
| 00002624 | 00065538 | 345.0106 | 89.9894 | 97.977 |
| 00002624 | 00065539 | 329.0056 | 105.9944 | 110.019 |
| 00002624 | 00065540 | 306.9976 | 128.0024 | 89.975 |
| 00002624 | 00065541 | 295.0169 | 139.9831 | 94.98 |
| 00065536 | 00002624 | 218.9924 | 91.0076 | 56.959 |
| 00065537 | 00002624 | 194.9942 | 90.0058 | 76.959 |
| 00065538 | 00002624 | 165.0104 | 89.9896 | 97.977 |
| 00065539 | 00002624 | 149.0052 | 90.9948 | 110.019 |
| 00065540 | 00002624 | 126.9971 | 88.0029 | 89.975 |
| 00065541 | 00002624 | 115.0163 | 89.9837 | 94.98 |

WIRELESS COMMUNICATION SYSTEM

BACKGROUND OF THE INVENTION

Field of the Invention

The present invention relates to a wireless communication system.

Description of the Related Art

In order to increase the capacity of wireless communication, a wider bandwidth and a higher frequency are used. In particular, development of a wireless communication device using a millimeter wave band is progressing rapidly. For example, the 60 GHz band is used in a small cell linked with a mobile communication network or a wireless access network of a wireless Internet service provider (WISP), or a wireless backhaul link for a wireless base station, a wireless relay station, or a public wireless LAN communication access point.

In the millimeter wave band where propagation loss is large, a beam antenna having high gain and sharp directivity is generally used. In the IEEE 802.11ad standard, in consideration that a communication partner moves and a plurality of communication partners perform Point to Multi-Point (P2MP) communication, a beamforming antenna whose beam direction can be changed by electrical control from a controller is used. In addition, in the IEEE 802.11ad standard, an optimum beam direction is explored when starting a communication and successively during the communication between the own station and the partner station.

In recent years, providing an Internet connection service using a wireless access network by a WISP has been spreading. In these services, the installation location of the user's antenna is fixed and does not move in principle. In the WISP, when a wireless communication device of a provider's side is a primary station and a wireless communication device of a user's side is a secondary station, at least one of the primary station and the secondary station has a beamforming antenna.

In the process of performing beamforming, the primary station and the secondary station recognize each other's existence, select an appropriate beam, and switch to a Modulation and Coding Scheme (MCS) according to wireless signal quality to perform communication. The installation status of the secondary station is registered and managed in a subscriber database. Such a subscriber database is used for securing stable communication and improving communication quality, as described in U.S. Pat. No. 7,120,436.

In a conventional technique performing beamforming, a wireless communication device may store a beam pattern table in advance. However, in the conventional technique, in such a case, the devices are arranged such that an angular interval of the radiation direction of each designed beam pattern is made to be uniform. Therefore, a difference in a gain occurs between a user at a peak direction of the beam and a user at a valley direction of the beam. For this reason, in the conventional technique, since the MCS is switched due to the occurrence of the difference in the gain, a difference may occur in a data rate. In addition, a beam pattern has sidelobes, which may cause interference and deteriorate communication quality. As a method for solving the above, it is conceivable to use a beam pattern in which a direction of an interference source is a null point.

Ideally, an optimized beam pattern in which the beam is directed in the direction of the user and there is a null point in the direction of the interference source is appropriately used. However, when such beam pattern is implemented by improving the wireless communication device, hardware functions may need to be improved, resulting in a significant cost increase.

SUMMARY OF THE INVENTION

The present invention has been made in view of the above circumstances, and provides a wireless communication system capable of performing beamforming by using an optimized beam table without significantly increasing the cost of a wireless communication device.

An aspect of the present invention is a wireless communication system including a first wireless communication device and a server communicably connected to the first wireless communication device. The server accumulates a plurality of optimized beam table, and selects therefrom an optimized beam table to be used by the first wireless communication device, and the first wireless communication device obtains the optimized beam table selected by the server by communicating with the server and performs a wireless communication using the obtained optimized beam table According to an aspect of the present invention, the server accumulates a plurality of optimized beam tables, the server selects an optimized beam table from among the plurality of optimized beam tables, and the first wireless communication device obtains the selected optimized beam table by communicating with the server, and performs a communication with the other wireless communication device using the obtained optimized beam table.

As a result, according to an aspect of the present invention, the first wireless communication device can perform beamforming using the optimized beam table without significantly increasing the cost.

In the wireless communication system according to an aspect of the present invention, the server may select the optimized beam table to be used by the first wireless communication device by referring to a subscriber database.

As a result, according to an aspect of the present invention, without waiting to be notified the necessary information to select the optimized beam table from the first wireless communication device, the server can select in advance the optimized beam table to be used by the first wireless communication device.

In the wireless communication system according to an aspect of the present invention, the wireless communication system may further include a second wireless communication device performing a wireless communication with the first wireless communication device, and in the subscriber database, an installation location of the second wireless communication device and an installation direction of an antenna of the second wireless communication device may be registered.

As a result, according to an aspect of the present invention, by referring to the subscriber database, the server can obtain information regarding the installation location of the second wireless communication device and the installation direction of the antenna of the second wireless communication device, and based on the information, the optimized beam table to be used by the first wireless communication device can be appropriately selected.

In the wireless communication system according to an aspect of the present invention, in the subscriber database, a latitude and a longitude may be registered as the installation location of the second wireless communication device.

As a result, according to an aspect of the present invention, when selecting the optimized beam table to be used by the first wireless communication device, the server can easily use the information of the installation location of the second wireless communication device.

In the wireless communication system according to an aspect of the present invention, in the subscriber database, an installation location of the first wireless communication device and an installation direction of an antenna of the first wireless communication device may be further registered, and a latitude and a longitude may be registered as the installation location of the first wireless communication device.

As a result, according to an aspect of the present invention, when the server selects an optimized beam table to be used by the first wireless communication device, the server only needs to access a single database to easily access both the information on the first wireless communication device and the information on the second wireless communication device.

In the wireless communication system according to an aspect of the present invention, the server may calculate a calculated direction of the second wireless communication device viewed from the first wireless communication device, and based on the calculated direction, may select an optimized beam table to be used by the first wireless communication device.

As a result, according to an aspect of the present invention, it is possible to improve communication quality of wireless communication between the first wireless communication device and the second wireless communication device using the selected optimized beam table.

In the wireless communication system according to an aspect of the present invention, in the optimized beam table, an angular interval between beams in a vicinity of an optimized direction may be narrower than an angular interval between beams in a direction other than the vicinity of the optimized direction.

As a result, according to an aspect of the present invention, it is possible to prevent the communication quality of the wireless communication between the first wireless communication device and the second wireless communication device from being deteriorated due to a fact that in the used beam table, the direction of the second wireless communication device viewed from the first wireless communication device corresponds to a direction of a valley between the beams and thus the MCS switching occur by the gain deterioration.

According to the aspects of the present invention described above, the beamforming can be performed by using the optimized beam table without significantly increasing the cost of the wireless communication device.

BRIEF DESCRIPTION OF THE DRAWINGS

FIG. 5 is a diagram showing a configuration example of a station database in a subscriber database according to an embodiment.

FIG. 6A is a diagram showing an example of a station database according to an embodiment.

FIG. 6B is a diagram showing an example of a station database according to an embodiment.

FIG. 7 is a diagram showing a configuration of an antenna database that stores information of each antenna in a subscriber database according to an embodiment.

FIG. 8 is a diagram showing an example of the antenna database of FIG. 7.

FIG. 9 is a diagram showing a configuration example of a wireless link database describing a relationship between two specific antennas in the subscriber database.

FIG. 10 is a diagram showing an example of the wireless link database of FIG. 9.

DETAILED DESCRIPTION OF THE PREFERRED EMBODIMENTS

Hereinafter, embodiments of the present invention will be described with reference to the drawings.
(Configuration Example of Wireless Communication System)

Figure 1:
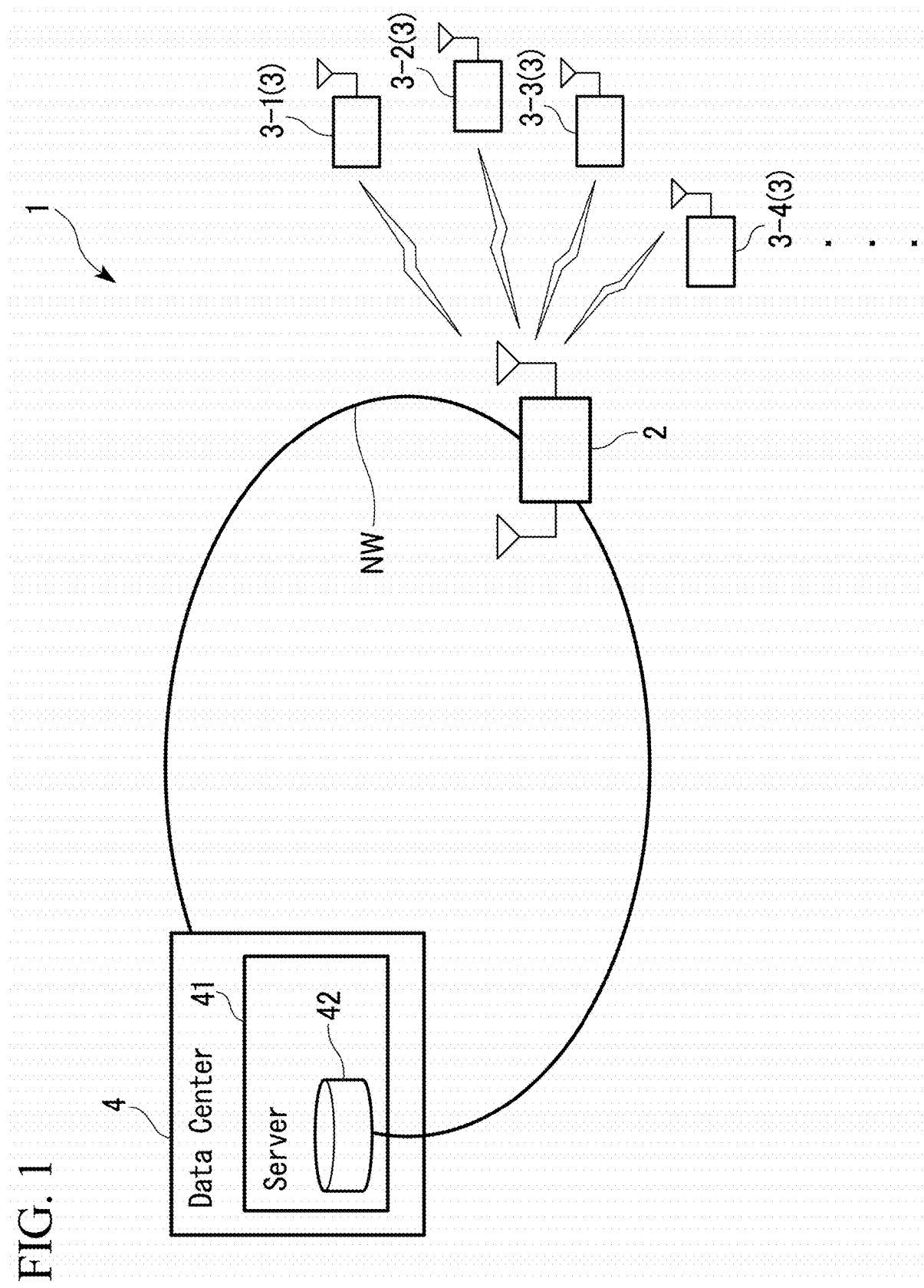
FIG. 1 is a diagram showing a configuration example of a wireless communication system assuming a WISP according to an embodiment.

FIG. 1 is a diagram showing a configuration example of a wireless communication system assuming a wireless Internet service provider (WISP) according to the embodiment.

As shown in FIG. 1, the wireless communication system 1 includes a first wireless communication device 2 and a second wireless communication device 3. When there is a plurality of the second wireless communication devices 3 and one of the plurality of second wireless communication devices 3 is specified, it is described as a second wireless communication device 3-$n$ ($n$ is an integer of one or more). In FIG. 1, a second wireless communication device 3-1, a second wireless communication device 3-2, a second wireless communication device 3-3, and a second wireless communication device 3-4 are described (n=4). When one of the plurality of second wireless communication devices 3 is not specified although there is the plurality of the second wireless communication devices 3, each device is described as the second wireless communication devices 3 and is not particularly distinguished.

In addition, the first wireless communication device 2 is connected to the data center 4 via a network NW. The data center 4 includes a server 41. The server 41 has a subscriber database 42.

The first wireless communication device 2 is a base station or a primary station, is connected to an upper-level network such as a provider network via the network NW such as an optical fiber line or another communication line, and is thereby connected to a network such as the Internet. The first wireless communication device 2 is a wireless communication device installed by a service provider such as a WISP or a wireless communication carrier. The first wireless communication device 2 obtains the optimized beam table optimized from the server 41 via the network NW, and communicates with the second wireless communication device 3 using the obtained optimized beam table. The first wireless communication device 2 performs wireless communication with the second wireless communication device 3 by beamforming.

The second wireless communication device 3 is a terminal or a secondary station of a fixed wireless access service, and is installed at a subscriber home who uses a service provided by a service provider, such as a WISP or a wireless communication carrier. The number of the second wireless communication device 3 may be one or more.

Each of the first wireless communication device 2 and the second wireless communication device 3 includes a beamforming antenna and a controller for executing beamforming inside the device. The first wireless communication device 2 and the second wireless communication device 3 recognize each other in the process of performing beamforming, select an appropriate beam, and select a Modulation and Coding Scheme (MCS) according to the wireless signal quality to perform wireless communication.

In the subscriber database 42, the customer (i.e., subscriber) information and information of the second wireless communication device 3 installed for each subscriber are stored. As a portion of the information of the second wireless communication device 3, the installation status where the second wireless communication device 3 is installed is stored for each second wireless communication device 3. The subscriber database 42 may be included in the server 41, may be connected to the server 41, or may be included in a server on a cloud that can communicate with the server 41.

The server 41 is installed in the data center 4, for example. The server 41 includes the subscriber database, or is in a status that the subscriber database is referable and stores a large number of beam tables for beamforming antennas in advance. The server 41 selects an optimized beam table to be used by the first wireless communication device 2 from a large number of stored beam tables based on the information in the subscriber database 42. For example, when a direction of the opposite second wireless communication device 3 viewed from the first wireless communication device 2 is a direction to be optimized, by referring to the subscriber database, the direction to be optimized is calculated, and an optimized beam table is determined based on the calculated direction. As the procedure determining the optimized beam table, in addition to the above, various methods are conceivable such that selecting a beam table having a null point in the direction where an interference source exists, and in order to avoid overreach interference, selecting a beam table constituted by a beam having a wide half power beam width to limit a reach distance. The server 41 stores and holds a large number of optimized beam tables. In addition, when the server 41 determines that a new optimized beam table should be prepared, the server 41 selects and combines appropriate ones from the stored set of AWVs or newly designs and combines AWVs to generate a new optimized beam table and store the newly generated optimized beam table. As a method for the first wireless communication device 2 to use the optimized beam table, a method in which the first wireless communication device 2 adaptively calculates and prepares an optimized beam table can be considered. However, in order for the adaptive calculation, a load of a Central Processing Unit (CPU) increases, so that it is necessary to adopt a CPU having a high processing capability on the first wireless communication device 2, resulting in a significant increase in cost. By generating the optimized beam table by the server 41, it is possible to avoid a significant increase in the cost of the first wireless communication device 2. Alternatively, a method is also conceivable in which a large number of optimized beam tables that presuppose various situations are stored in advance in the storage 2231 included in the first wireless communication device 2 and are appropriately selected and used. However, in order to store the large number of optimized beam tables in advance, it is necessary to increase the capacity of the storage 2231, resulting in a significant increase in cost. By storing the optimized beam table in the server 41, it is possible to avoid a significant increase in the cost of the first wireless communication device 2. Note that the server 41 may be installed outside the data center 4, and may be a virtual server or a cloud server. The information on the first wireless communication device 2 installed by the WISP side may be registered separately in the base station database separated from the subscriber database 42, and may be registered together with the information on the second wireless communication device 3 in the subscriber database 42. When registering information according to the first wireless communication device 2 in the subscriber database 42, the server 41 only accesses the single subscriber database 42, and thereby, the server 41 can access both the information of the first wireless communication device 2 and the information of the second wireless communication device 3, which is efficient.

In FIG. 1, a router which is not shown in the drawing is installed in the network NW and the network NW may be connected to the Internet or the like via the router. In this case, the first wireless communication device 2 or the second wireless communication device 3 is indirectly connected to the Internet or the like.

Note that the first wireless communication device 2 and the second wireless communication device 3 are not limited to a service provider and a service user, and an organization such as a company or a public organization can use both as an internal network.

Figure 2:
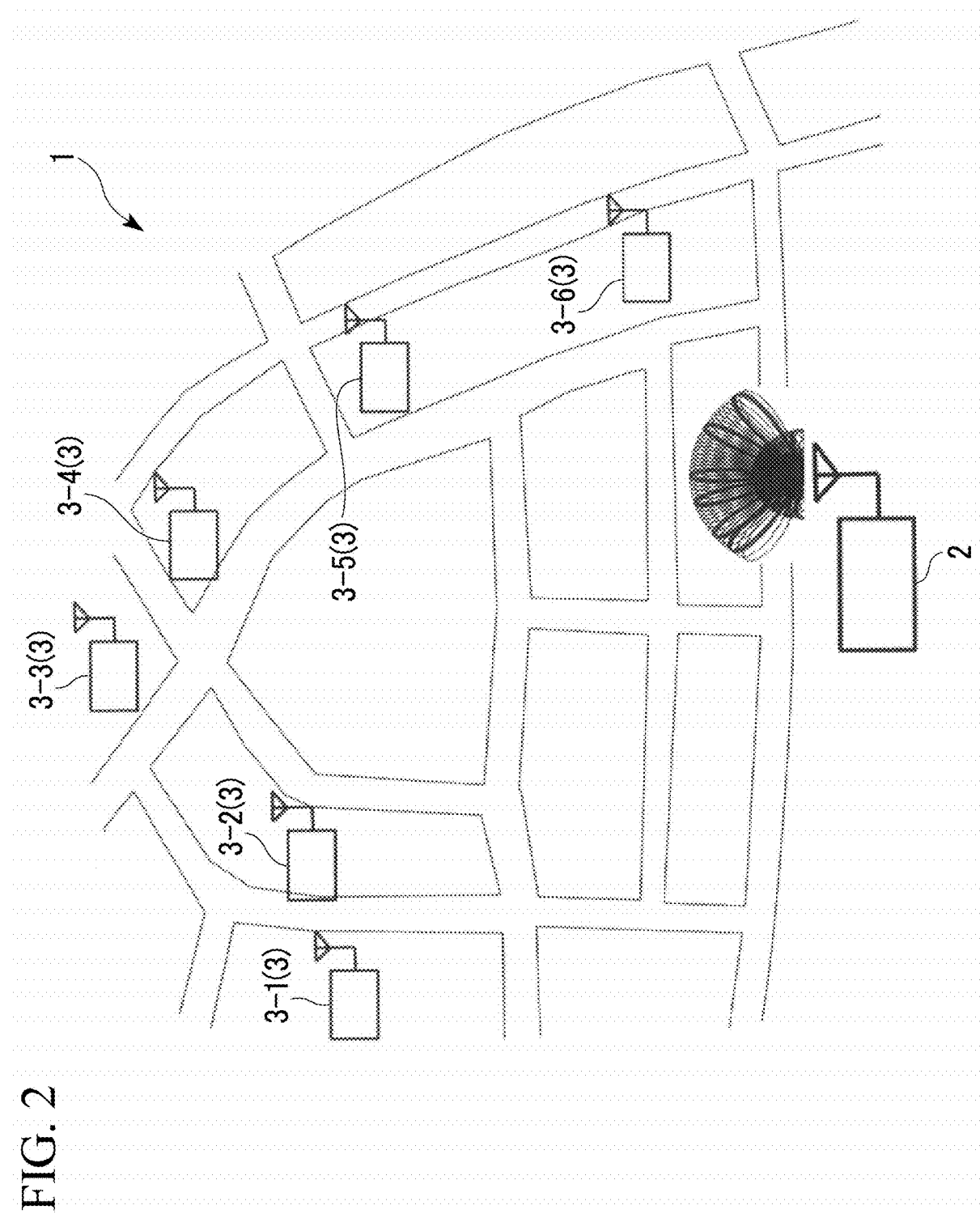
FIG. 2 is a diagram showing a usage example of the first wireless communication device and the second wireless communication device according to an embodiment.

FIG. 2 is a diagram showing a usage example of the first wireless communication device 2 and the second wireless communication device 3 according to an embodiment.

In FIG. 2, the first wireless communication device 2 is a primary station, is a PCP of IEEE 802.11ad, includes a beamforming antenna, and performs wireless communication using, for example, a millimeter wave of 60 GHz.

The second wireless communication device 3 is a secondary station, is a STA of IEEE 802.11ad, includes a beamforming antenna, and performs wireless communication using, for example, a millimeter wave of 60 GHz.

The first wireless communication device 2 and the second wireless communication device 3 are not limited to the PCP and the STA, respectively. The first wireless communication device 2 may be a base station of a mobile communication network, and may be an Access Point (AP) of other various wireless communication systems. Further, the second wireless communication device 3 may be a user terminal of other various wireless communication systems, such as a Customer Premises Equipment (CPE) of a mobile communication network, or a User Equipment (UE).

(Explanation of Terms used in Embodiment)

Here, an outline of a wireless communication device that performs communication using a beamforming antenna and terms used in the embodiments will be described.

In the basic configuration of a beamforming antenna, by feeding each of the aligned antenna elements with a phase shifted signal so that radio waves with the same phase in the desired direction are radiated, and a beam with sharp directivity is radiated.

In designing a beam pattern of a beam that radiates a radio wave in a desired direction, the phase and the power to be supplied to each antenna element are determined by calculating the phase condition such that the radio waves radiated from the antenna element are interfered and intensified in a desired direction based on the arrangement of each antenna element of the antenna array, the distance between the antenna elements, the wavelength of the radiated radio wave, and the like.

A wireless communication device including a beamforming antenna includes a beam table constituted by a plurality of antenna weight vectors (AWVs). Here, the AWV indicates a vector representing the gain of the amplitude adjuster and the amount of phase shift of the variable phase shifter corresponding to each antenna element. When the beamforming antenna is configured by the n number of antenna elements, the n sets of AWVs indicates one beam pattern.

A calculation of the radiation directivity of the entire array antenna solely based on the AWV is referred to as an array factor. When the antenna element is an omnidirectional antenna, the array factor is the radiation pattern of the entire array antenna as it is. When the antenna element has directivity, the product of the array factor and the radiation pattern of the antenna element is the radiation pattern of the entire array antenna.

(Configuration Example of Wireless Communication Device)

Figure 3:
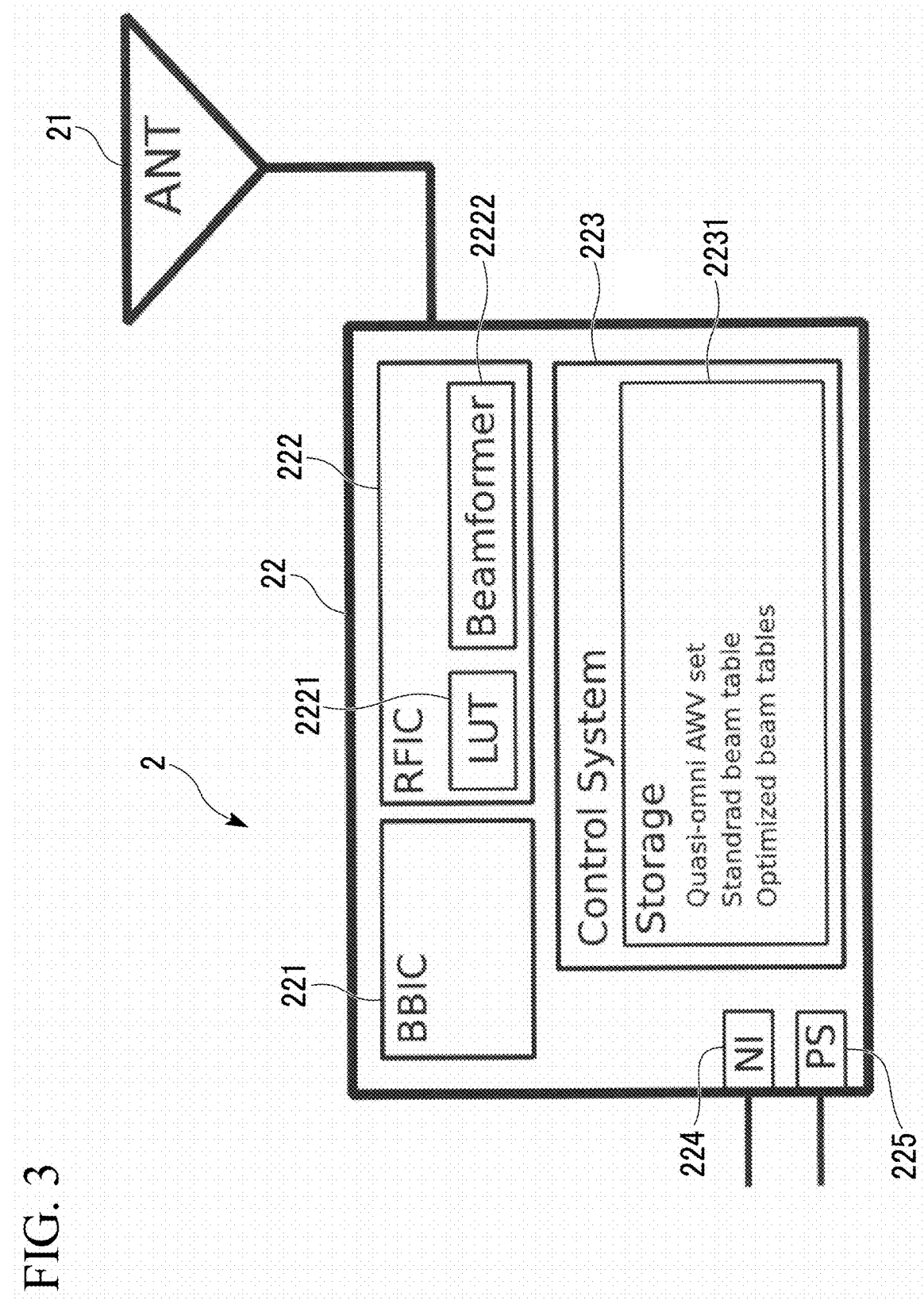
FIG. 3 is a block diagram showing a configuration example of a wireless communication device according to an embodiment.

FIG. 3 is a block diagram showing a configuration example of the wireless communication device according to the embodiment. As shown in FIG. 3, the first wireless communication device 2 includes an antenna 21 and a controller 22.

The controller 22 includes a BBIC 221, an RFIC 222, a control 223, a network interface (NI) 224, and a power supply (PS) 225.

The RFIC 222 includes an LUT 2221 and a beamformer 2222.

The control system 223 includes a storage 2231.

The first wireless communication device 2 performs communication with the second wireless communication device 3 by sequentially switching between the quasi-omni beam pattern and the beam table according to, for example, the IEEE 802.11ad protocol. In addition, when the number of the second wireless communication device 3 and the direction of each second wireless communication device 3 from the first wireless communication device 2 are known, the first wireless communication device 2 performs communication using the optimized beam table instead of the standard beam table.

The antenna 21 is a digital phased array type beamforming antenna in which a plurality of antenna elements are arranged and the plurality of antenna elements can be electrically controlled by a set value of an antenna weight vector (AWV).

The BBIC 221 is, for example, a baseband integrated circuit. The BBIC 221 is a circuit portion that processes a baseband signal, and mediates control of the RFIC 222 from the control system 223 in some cases.

The RFIC 222 is, for example, a radio frequency integrated circuit, is in charge of processing of high-frequency signals, transmits and receives millimeter-wave signals, and performs beamforming. The RFIC 222 sets the AWV by setting a numerical value in the LUT 2221.

The LUT 2221 is a look-up table and accommodates a set of the plurality of AWVs as a beam pattern table. Note that each set of AWVs corresponds to one beam pattern and is constituted by AWVs corresponding to the number of antenna elements.

The beamformer 2222 controls feeding to the antenna element based on the set value of the AWVs.

The control system 223 is connected to the network NW connected to the first wireless communication device 2 via the NI 224. The control system 223 mediates communication between the network NW via the NI 224 and the wireless communication network connected via a communication line via the antenna 21 by controlling the BBIC 221 and the RFIC 222. The control system 223 executes the control of the BBIC 221 and the RFIC 222 according to, for example, a program by referring to various databases. The control system 223 obtains the optimized beam tables corresponding to the arrangement situation of the first wireless communication device 2 and the second wireless communication device 3 from the server 41, and stores the obtained optimized beam tables in the storage 2231. The control system 223 may include a central processing unit (CPU), a system-on-a-chip (SoC), an application specific integrated circuit (ASIC), and the like.

In the storage 2231, a set of AWVs for the quasi-omni beam pattern and a standard beam table in which the angular intervals of the beams are equally spaced are stored in advance. In addition, the storage 2231 stores the optimized beam table obtained by the control system 223 from the server 41. The storage 2231 is a recording medium such as a hard disk drive (HDD), a solid state drive (SSD), and a flash memory. Alternatively, the storage 2231 may be a nonvolatile storage area which is included inside the ASIC, the SoC and the like. Further, the area storing the optimized beam table obtained from the server 41 may be a volatile storage area.

The NI 224 is a network interface for connecting the first wireless communication device 2 to the network NW.

The PS 225 is a power supplier, and supplies power supplied from the outside to each portion of the first wireless communication device 2.

(Optimized Beam Table)

Next, an example of the optimized beam table will be described.

Figure 4:
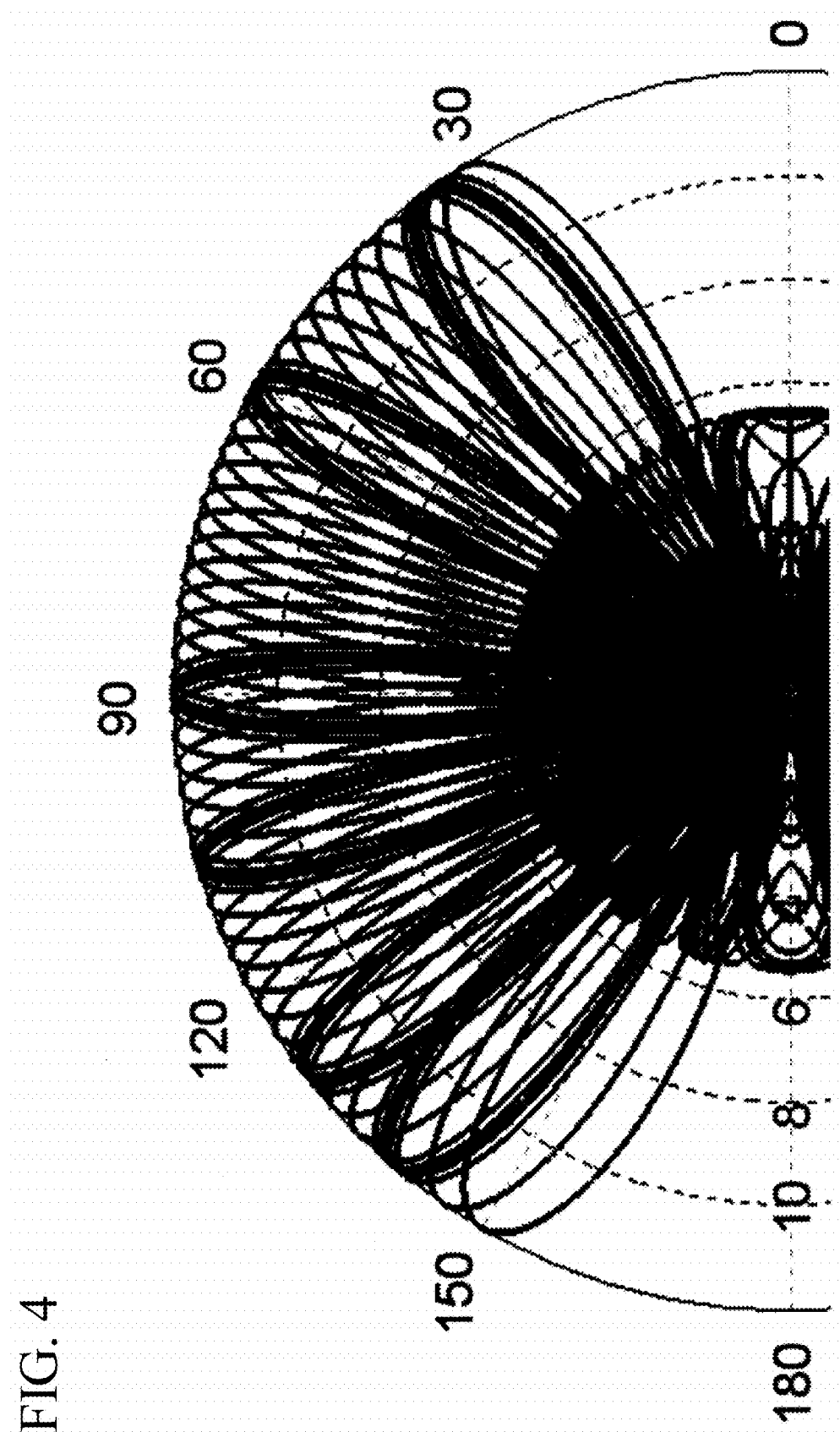
FIG. 4 is a diagram showing array factors of an optimized beam table according to an embodiment in polar coordinates.

FIG. 4 is a diagram showing array factors of an optimized beam table according to the present embodiment in polar coordinates. The optimized beam table of FIG. 4 is formed such that when the installation direction of the second wireless communication device 3 as the secondary station viewed from the beamforming antenna of the first wireless communication device 2 as the primary station is 36, 60, 90, 106, 128, and 140 degrees, the beam table optimized with respect to the six directions. For this reason, in the optimized beam table, the angular interval between the beams in the vicinity of the optimized direction is narrower than the angular interval between the beams of the direction other than the vicinity of the optimized direction.

In addition, in FIG. 4, the antenna is a digital phased array antenna constituted by a planar patch antenna including sixteen reception elements and sixteen transmission elements. FIG. 4 shows an example of the array factor which is designed so as to cover an angular range of 120 degrees from 30-150 degrees when a front of the antenna is directed to the north, it is defined that the east as a 0-degree direction, the north as a 90-degree direction, and the west as a 180-degree direction.

Although the example of FIG. 4 is an example of an angular range of 120 degrees from 30-150 degrees, the angular range is not limited to this and may be any angular range according to the intended use.

When using a standard beam table in which an angular interval of the beam is equally spaced, the direction of the second wireless communication device 3 of a secondary station is a valley between the beams where the gain is deteriorated.

For example, reception sensitivity required for the MCS 10 is −55 dBm, reception sensitivity required for the MCS 11 is −54 dBm, and reception sensitivity required for the MCS 12 is −53 dBm. When using the standard beam table as described above, the MCS is switched by a slight difference of wireless signal quality (reception sensitivity in this case). As a result, when the standard beam table is used, a user located in the beam direction has good wireless signal quality, and a user located in the valley of the beams has deteriorated wireless signal quality.

Even when a distance from the service providing antenna of the first wireless communication device 2 to the user's antenna of the second wireless communication device 3 is equivalent, it may occur that one user can use the MCS 12; however, the other user can only use the MCS 11.

In the IEEE 802.11ad standard, the data rate in each MCS is 3,080 Mbps in MCS 10, 3,850 Mbps in MCS 11, and 4,620 Mbps in MCS 12.

On the other hand, in the present embodiment, by narrowing the beam interval in the vicinity of the optimized direction, compared with the case where the standard beam table in which the angular intervals of the beams are equally spaced is used, it is possible to prevent selecting the low-speed MCS caused by the gain deterioration because the second wireless communication device 3 of the secondary station is located in the valley between the beams.

FIG. 5 is a diagram showing a configuration example of a station database in a subscriber database 42 according to the present embodiment. As shown in FIG. 5, the station database is constituted by STATION_ID, SUBSCRIBER_ID, ACCOUNT_ID, NAME_FIRST, NAME_MIDDLE, NAME_LAST, ADDRESS, EQUIPMENT_TYPE, BF_ANT_NO, BF_ANT_ID_01, BF_ANT_ID_02, BF_ANT_ID_03, BF_ANT_ID_04, BF_ANT_ID_05, BF_ANT_ID_06, BF_ANT_ID_07, and BF_ANT_ID_08.

The STATION_ID is a unique ID specifying the first wireless communication device 2 and the second wireless communication device 3, and the TYPE is an integer (INT) and the data length thereof is 4 bytes.

The SUBSCRIBER_ID is a unique ID specifying the users according to the second wireless communication device 3, and the TYPE is an integer (INT) and the data length thereof is 4 bytes.

The ACCOUNT_ID is a unique ID specifying an account according to the payment occurring in the second wireless communication device 3, and the TYPE is an integer (INT) and the data length thereof is 4 bytes.

The NAME_FIRST, the NAME_MIDDLE, and the NAME_LAST are names of users, and the TYPE is a variable length character string (VARCHAR) and the data length thereof is variable.

The ADDRESS is an address of the user, and the TYPE is a variable length character string (VARCHAR) and the data length thereof is variable.

The EQUIPMENT_TYPE is an integer value corresponding to a value of an enum type (enumeration type) value indicating the type of the second wireless communication device 3, and the TYPE is an integer (INT) and the data length thereof is 4 bytes.

The BF_ANT_NO is the number of beamforming antennas connected to the second wireless communication device 3, and the TYPE is an integer (INT) and the data length thereof is 4 bytes.

In the BF_ANT_ID_01 to the BF_ANT_ID_08, unique IDs specifying the antenna information are stored where a BF_ANT_NO is an upper limit, and serves as an index for referring to the antenna database. Each of the BF_ANT_ID_01 to the BF_ANT_ID_08 has a TYPE which is an integer (INT) and the data length thereof is 4 bytes.

FIG. 6A is a diagram showing an example of a station database according to the present embodiment, and shows the first to eighth columns. FIG. 6B is a diagram showing an example of a station database according to the present embodiment, and shows the ninth to seventeenth columns. Although FIGS. 6A and 6B are one table, they are separately described for convenience.

In FIGS. 6A and 6B, the first wireless communication device 2 having the ACCOUNT_ID of 00000000 and the STATION_ID of 00060128 in which the name columns are all BS is installed by the WISP as a primary station (PCP).

The six second wireless communication devices 3 with STATION_IDs of 00062048 to 00062053 are a CPE-type wireless communication device (STA) installed in user's homes contracted with the WISP.

The first wireless communication device 2 having the STATION_ID of 00060128 is connected to the two beamforming antenna, and one beamforming antenna is respectively connected to the six devices with STATION_IDs of Ser. No. 00/062,048 to Ser. No. 00/062,053.

FIG. 7 is a diagram showing a configuration of an antenna database that stores information of each antenna in a subscriber database 42 according to the present embodiment. As shown in FIG. 7, the antenna database is constituted by BF_ANT_ID, BF_ANT_TYPE, BF_ANT_LATITUDE, BF_ANT_LONGITUDE, BF_ANT_ORIENTATION, BF_ANT_MAX_SECTOR_NO, BF_ANT_MAX_BEAM_NO, BF_ANT_CUR_BEAMTABLE, and BF_ANT_CUR_BEAM_NO.

The BF_ANT_ID is a unique ID specifying the antenna information, and the TYPE is an integer (INT) and the data length thereof is 4 bytes.

The BF_ANT_TYPE is an integer value corresponding to a value of an enum type indicating an antenna type, and the TYPE is an integer (INT) and the data length thereof is 4 bytes.

The BF_ANT_LATITUDE is a latitude of the installation location of the antenna. Here, the north latitude is input, and the TYPE is a double precision floating point number (DOUBLE), and the data length is 8 bytes.

The BF_ANT_LONGITUDE is the longitude of the installation location of the antenna. Here, east longitude is input, and the TYPE is a double precision floating point number (DOUBLE), and the data length thereof is 8 bytes.

The BF_ANT_ORIENTATION indicates the installation orientation of the antenna and an orientation is inputted that is a front of the beamforming antenna, in other words, the orientation corresponding to the direction of 90 degrees in designing the array factor, which is expressed in degrees when the north is 0 degrees or 360 degrees, the east is 90 degrees, the south is 180 degrees, and the west is 270 degrees. In a beamforming antenna in which 0 degree is inputted to the BF_ANT_ORIENTATION, when designing the array factor shown in FIG. 4, 0 degree is east, 90 degrees is north, and 180 degrees is west. In a beamforming antenna in which 90 degree is inputted to the BF_ANT_ORIENTATION, when designing the array factor, 0 degree is the south, 90 degrees is the east, and 180 degrees is the north. In the BF_ANT_ORIENTATION, the TYPE is a double precision floating point number (DOUBLE), and the data length thereof is 8 bytes.

The BF_ANT_MAX_SECTOR_NO is a maximum value of the number of sectors in the sector level sweep (SLS), and the TYPE is an integer (INT) and the data length thereof is 4 bytes.

The BF_ANT_MAX_BEAM_NO is a maximum value of the beam number in the beamforming operation using the standard beam table or the optimized beam table, and the TYPE is an integer (INT) and the data length thereof is 4 bytes.

In the BF_ANT_CUR_BEAMTABLE, when there is the optimized beam table, the UUID thereof is inputted, and the TYPE thereof is universally unique identifier (UUID) and the data length thereof is 16 bytes. The optimized beam table is accumulated in the server 41 in association with the UUID, and the optimized beam table can be specified by the UUID.

The BF_ANT_CUR_BEAM_NO is the number of beams used in the optimized beam table, and is equal to or smaller than the BF_ANT_MAX_BEAM_NO, and the TYPE is an integer (INT) and the data length thereof is 4 bytes.

FIG. 8 is a diagram showing an example of the antenna database of FIG. 7.

Two antennas with BF_ANT IDs of 00002624 and 00002625 are antennas connected to the first wireless communication device 2 with STATION_ID of Ser. No. 00/060,128. The two antennas have the same values of latitude and longitude. The antenna of 00002624 is installed in an azimuth angle of 345 degrees, that is, inclined by 15 degrees west from north, and the antenna of 00002625 is installed in an azimuth angle of 75 degrees, that is, inclined by 15 degrees north from east.

The antenna with BF_ANT_ID of 00065536 is connected to the second wireless communication device 3 with STATION_ID of Ser. No. 00/062,048. The antenna with BF_ANT_ID of 00065537 is connected to the second wireless communication device 3 with STATUS ID of Ser. No. 00/062,049. The antenna with BF_ANT_ID of 00065538 is connected to the second wireless communication device 3 with STATION_ID of Ser. No. 00/062,050. The antenna with BF_ANT_ID of 00065539 is connected to the second wireless communication device 3 with STATION_ID of Ser. No. 00/062,051. The antenna with BF_ANT_ID of 00065540 is connected to the second wireless communication device 3 with STATUS ID of Ser. No. 00/062,052. The antenna with BF_ANT_ID of 00065541 is connected to the second wireless communication device 3 with STATION_ID of 0062053.

The antennas of these secondary stations are mounted on poles so that the directions can be adjusted, and that the antennas are installed such that the front faces toward the wireless communication device of 00060128 as the primary station at the time of installation.

FIG. 9 is a diagram showing a configuration example of a wireless link database describing a relationship between two specific antennas in the subscriber database 42. As shown in FIG. 9, the wireless link database is constituted by FROM BF_ANT_ID, TO BF_ANT_ID, LINK_ORIENTATION, LINK_BF_DIRECTION, and LINK_DISTANCE.

The FROM BF_ANT_ID is an ID of the antenna on a starting side of the wireless link, and the TYPE is an integer (INT) and the data length thereof is 4 bytes.

The TO BF_ANT_ID is an ID of the antenna on an end side, and the TYPE is an integer (INT) and the data length thereof is 4 bytes.

Regarding the LINK_ORIENTATION, the orientation thereof is determined when the BF_ANT_LATITUDE and the BF_ANT_LONGITUDE of the antenna of the FROM BF_ANT_ID is a start point, and the BF_ANT_LATITUDE and the BF_ANT_LONGITUDE of the antenna of the TO BF_ANT_ID is an end point. In the LINK_ORIENTATION, the TYPE is a double precision floating point number (DOUBLE), and the data length thereof is 8 bytes.

The LINK_BF_DIRECTION is obtained by converting BF_ANT_ORIENTATION (belonging to the antenna database) of the antenna of FROM BF_ANT_ID (belonging to the antenna database) and LINK_ORIENTATION (belonging to the wireless link database) into a direction in the design of the antenna array factor.

In LINK_BF_DIRECTION, the TYPE is a double precision floating point number (DOUBLE), and the data length thereof is 8 bytes.

The LINK_DISTANCE is obtained by calculating a distance between the antennas where the unit thereof is recorded by m (meter), and the TYPE is a double precision floating point number (DOUBLE) and the data length thereof is 8 bytes.

FIG. 10 is a diagram showing an example of the wireless link database of FIG. 9.

As shown in FIG. 10, regarding information on one wireless link between the antenna of the BF_ANT_ID of 00002624 and the antenna of the BF_ANT_ID of 00065536, two cases are recorded to the database such that the case where a start point is the antenna of the BF_ANT_ID of 00002624 and the case where a start point is the antenna of the BF_ANT_ID of Ser. No. 00/065,536. In the calculation, an earth ellipsoid model of the Geodetic Reference System 1980 (GRS 80), which is one of the models of the earth ellipsoid in geodesy, was used.

The server 41 extracts the record with FROM BF_ANT_ID of 00002624 (first wireless communication device 2) in FIG. 10, so that the server 41 determines that the second wireless communication device 3 which is a communication target is installed in six directions of 39, 15, 345, 329, 307, and 295 degrees as viewed from the antenna. In addition, in view of the direction in which the beamforming antenna of the first wireless communication device 2 is installed, the server 41 sets the directions of 36, 60, 90, 106, 128, and 140 degrees as a target direction to be optimized in designing the array factor.

When the beam table already optimized in that target direction to be optimized and BF_ANT_TYPE matching with MM60_16_16_A, which is the same BF_ANT_TYPE of the antenna with FROM BF_ANT_ID of Ser. No. 00/002,624, is already exist in the server 41, the server 41 determines that the beam table is the optimized beam table to be obtained by the first wireless communication device 2, in which the STATION_ID is 00060128, for the antenna in which the FROM BF_ANT_ID is 00002624.

When the suitable optimized beam table does not exist in the server 41, the server 41 newly creates a beam table, generates a UUID, stores the UUID in association with the beam table, and determines that the beam table is the optimized beam table to be obtained by the first wireless communication device 2, in which the STATION_ID is 00060128.

The beam table which is determined by the server 41 in such a manner and in which the UUID is c4a0469c-0bd8-4f51-8b76-7a9163cd89e9 is a beam table shown in FIG. 4. The first wireless communication device 2 having the STATION_ID of 00060128 obtains this beam table from the server 41, and applies the beam table to the antenna in which the BF_ANT_ID is 00002624. The first wireless communication device 2 having the STATION_ID of 00060128 uses the obtained optimized beam table to provide a service, for example, as shown in FIG. 2.

Regarding the wireless link in which a start point is a secondary station, the antenna of the secondary station is installed substantially toward the primary station. Therefore, any of the LINK_BF_DIRECTION is approximately 90 degrees. For example, each of the beam tables is optimized such that the beam table having the UUID of 779f6ed0-aa12-4561-8e9c-b1a121ce4f56 is optimized in the 88-degree direction, the beam table having the UUID of 43148b25-11bb-4257-b298-8818e5624e84 is optimized in the 90-degree direction, and the beam table having the UUID of d172b0ba-2b35-44db-8ae5-715e60b1da98 is optimized in the 91-degree direction.

As described above, in the present embodiment, a large number of optimized beam tables are accumulated in the server 41, and the optimized beam table to be used by the first wireless communication device is selected from the large number of optimized beam tables. In addition, information on the latitude, longitude, and installation direction of the antenna is stored in the subscriber database 42 included in the server 41. In the present embodiment, the server 41 calculates the direction of another wireless communication device to be a communication partner viewed from one wireless communication device based on the stored information. In the present embodiment, the first wireless communication device 2 which is a primary station obtains and uses the optimized beam table selected based on the calculated direction of the second wireless communication device 3 which is a secondary station. In the present embodiment, in the optimized beam table, the interval between the beams is narrowed in the vicinity of the optimized direction.

Therefore, according to the present embodiment, the first wireless communication device 2 which is the primary station obtains and uses the optimized beam table from the server 41, thereby without causing a significant increase in the cost of the first wireless communication device 2, the first wireless communication device 2 can use the optimized beam table. Furthermore, by communicating with the second wireless communication device 3 using the optimized beam table in which the angular interval between the beams is narrowed in the vicinity of the optimized direction, it is possible to reduce the deterioration in gain depending on a direction and communication quality can be improved.

As described above, the embodiments for carrying out the present invention have been described using the embodiments. However, the present invention is not limited to these embodiments, and various modifications and substitutions can be made without departing from the scope of the present invention.

What is claimed is:

1. A wireless communication system comprising:
a first wireless communication device and a server communicably connected to the first wireless communication device; and
a second wireless communication device performing a wireless communication with the first wireless communication device, wherein:
the server accumulates a plurality of optimized beam tables, and selects therefrom an optimized beam table to be used by the first wireless communication device by referring to a subscriber database in which the subscriber information and information of the second wireless communication device installed for each subscriber are stored;
the first wireless communication device obtains the optimized beam table selected by the server by communicating with the server, and performs a wireless communication using the obtained optimized beam table;
in the subscriber database, an installation location of the second wireless communication device and an installation direction of an antenna of the second wireless communication device are registered; and
in the subscriber database, a latitude and a longitude are registered as the installation location of the second wireless communication device.

2. The wireless communication system according to claim 1, wherein in the subscriber database, an installation location of the first wireless communication device and an installation direction of an antenna of the first wireless communication device are further registered, and a latitude and a longitude are registered as the installation location of the first wireless communication device.

3. The wireless communication system according to claim 2, wherein the server calculates a calculated direction of the second wireless communication device viewed from the first wireless communication device, and based on the calculated direction, selects an optimized beam table to be used by the first wireless communication device.

4. The wireless communication system according to claim 3, wherein in the optimized beam table, an angular interval between beams in a vicinity of an optimized direction is narrower than an angular interval between beams in a direction other than the vicinity of the optimized direction.

* * * * *